United States Patent [19]
Chen et al.

[11] Patent Number: 5,866,042
[45] Date of Patent: Feb. 2, 1999

[54] METHODS AND COMPOSITIONS FOR INHIBITING CORROSION

[75] Inventors: Jen-Chi Chen, Morrisville, Pa.; William C. Ehrhardt, Hamilton, N.J.

[73] Assignee: BetzDearborn Inc., Trevose, Pa.

[21] Appl. No.: 896,781

[22] Filed: Jul. 18, 1997

[51] Int. Cl.⁶ ...................................................... C02F 5/10
[52] U.S. Cl. ................ 252/389.52; 252/389.53; 252/396; 252/180; 210/701
[58] Field of Search ......................... 252/389.52, 389.53, 252/396, 180; 210/701

[56] References Cited

U.S. PATENT DOCUMENTS

| | | | |
|---|---|---|---|
| 2,529,177 | 11/1950 | Nieland et al. | 210/23 |
| 2,529,178 | 11/1950 | Nieland et al. | 210/23 |
| 3,116,105 | 12/1963 | Kerst | 21/2.7 |
| 3,753,709 | 8/1973 | Staudenmayer | 96/1.5 |
| 4,529,572 | 7/1985 | Romberger et al. | 252/396 |
| 4,659,481 | 4/1987 | Chen | 210/697 |
| 4,774,018 | 9/1988 | Chagnaid et al. | 252/389.53 |
| 5,308,498 | 5/1994 | Fong et al. | 210/697 |
| 5,380,784 | 1/1995 | Usaki et al. | 524/407 |
| 5,616,278 | 4/1997 | Carey et al. | 252/180 |
| 5,767,199 | 6/1998 | Bors et al. | 525/153 |

FOREIGN PATENT DOCUMENTS

| | | |
|---|---|---|
| 2100985 | 1/1994 | Canada . |
| 0311192 | 7/1992 | European Pat. Off. . |
| 2513735 | 10/1975 | Germany . |

*Primary Examiner*—Jacqueline V. Howard
*Attorney, Agent, or Firm*—Alexander D. Ricci; Philip H. Von Neida

[57] ABSTRACT

The present invention provides for methods and compositions for inhibiting the corrosion of iron-containing metals in contact with aqueous systems. The present invention further provides for compositions and methods for inhibiting pitting of iron-containing metals in contact with aqueous systems. The methods include the use of a copolymer of acrylic or methacrylic acid and 2-acetoacetoxyethylmethacrylate with or without a polyvalent metal salt or a polyhydroxypolycarboxylic acid.

30 Claims, No Drawings

METHODS AND COMPOSITIONS FOR INHIBITING CORROSION

FIELD OF THE INVENTION

The present invention relates to methods and compositions for inhibiting iron corrosion in aqueous systems. More particularly, the present invention relates to the use of low molecular weight copolymers to inhibit iron metal corrosion in aqueous systems such as cooling water systems.

BACKGROUND OF THE INVENTION

In many industrial processes, undesirable excess heat is removed by the use of heat exchangers in which water is used as the heat exchange fluid. The term "cooling water" is applied wherever water is circulated through equipment to absorb and carry away heat. This definition includes air conditioning systems, engine jacket systems, refrigeration systems as well as the multitude of industrial heat exchange operations, such as found in oil refineries, chemical plants, steel mills, etc.

The use of a recirculating system, in which a cooling tower, spray pond, evaporative condenser and the like serve to dissipate heat, permits great economy in makeup water requirements. In a cooling water system employing a cooling tower, water is circulated through the heat transfer equipment and subsequently cooled by evaporation of a part of the circulating water as the water is passed over the cooling tower. By virtue of the evaporation which takes place in cooling, the dissolved solids and suspended solids in the water become concentrated. The circulating water becomes more concentrated than the makeup water due to this evaporation loss.

"Cycles of concentration" is the phrase employed to indicate the degree of concentration of the circulating water as compared with the makeup. For example, 2.0 cycles of concentration indicates the circulating water is twice the concentration of the makeup water. To maintain the circulating water at some given cycles of concentration, a portion of the circular water must be physically removed from the system and replaced with fresh makeup water to maintain a steady-state condition. The circulating water removed from the system is referred to as "blowdown".

Preventing the corrosion of industrial heat transfer equipment is essential to the efficient and economical operation of a cooling system. Excessive corrosion of metallic surfaces can cause the premature failure of process equipment, necessitating downtime for the replacement or repair of the equipment.

Additionally, the buildup of corrosion products on heat transfer surfaces impedes water flow and reduces heat transfer efficiency, thereby limiting production or requiring down time for cleaning, and can also cause rapid localized corrosion and subsequent penetration of metallic surfaces through the formation of differential oxygen concentration cells. The localized corrosion resulting from differential oxygen cells originating from deposits is commonly referred to as "under-deposit corrosion". "Galvanic corrosion" can also occur if the corrosion products include metals different from that of the metal surface.

With the advent of strict Federal, State and Municipal Environmental controls and water shortages throughout the country, recirculating cooling water systems were, in many cases, forced to operate at higher cycles of concentration to reduce both water consumption and the volume of blowdown from the system. As the cycles of concentration increase, corrosion problems become more severe because of the higher dissolved salt concentrations that are encountered. Higher cycles will also increase the concentration of corrosive agents that are not present in the makeup water, but are introduced during the course of the cooling operation. These may include, for example, hypochlorite ions added for their biocidal action, sulfide ions present through process leaks, sulfate or chloride ions added as their hydrogen acids to control pH, or corrosion products that are dissolved, dispersed or redeposited throughout the system.

SUMMARY OF THE INVENTION

It has been discovered that copolymers of acrylic acid or methacrylic acid and 2-acetoacetoxyethylmethacrylate inhibit the corrosion of iron-containing metals in contact with aqueous systems. These copolymers are also effective when used with certain metal ions, such as zinc.

Additionally, the copolymers will reduce pitting of iron-containing metal surfaces when employed with polyhydroxycarboxylate-type compounds.

DESCRIPTION OF THE RELATED ART

U.S. Pat. No. 3,116,105 teaches, corrosion inhibiting compositions for ferrous metals, copper, aluminum, brass and zinc comprising zinc, phosphates and hydroxycarboxylic acids. U.S. Pat. Nos. 2,529,177 and '178 teach the use of hydroxypolycarboxylates to inhibit metallic corrosion in aqueous systems.

German Offenlegungsschrift 25 13 735 teaches corrosion inhibition of metals in aqueous systems with a composition comprising zinc, phosphate, phosphonate or polymeric dispersant, and polycarboxylic acids.

DETAILED DESCRIPTION OF THE INVENTION

The present invention relates to a method for inhibiting the corrosion of iron-containing metals in contact with aqueous systems comprising adding to the aqueous system an effective corrosion inhibiting amount of a copolymer having the formula:

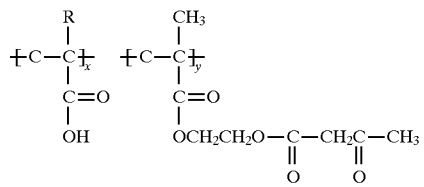

wherein R is H or $CH_3$; and the ratio of x:y ranges from 10:1 to 1:1.

The present invention further comprises compositions for inhibiting the corrosion of iron-containing metals in contact with aqueous systems comprising adding to said aqueous system an effective corrosion inhibiting amount of the copolymer and a polyvalent metal salt capable of providing a metal ion selected from the group consisting of zinc, manganese, nickel, aluminum, and tin.

The present invention further comprises methods and compositions for inhibiting pitting of iron-containing metals in contact with aqueous systems comprising adding to the system an effective pitting inhibiting amount of the copolymer and a polyhydroxycarboxylate compound.

The copolymers of the present invention are copolymers of acrylic acid (AA) or methacrylic acid (MA) and 2-acetoacetoxyethylmethacrylate (MEM). These monomers are in a ratio ranging from 10:1 to 1:1. These copolymers have molecular weights ranging from about 100 to about 100,000 with a molecular weight of about 200 to about 50,000 preferred. The preferred copolymer is AA:AAEM in a 2 to 1 ratio having a molecular weight of about 500 to about 1500.

The metal ions having utility in the present invention are selected from the group consisting of $Zn^{+2}$, $Mn^{+2}$, $Ni^{+2}$, $Al^{+3}$, and $Sn^{+2}$. The metal ion is added to the aqueous system in an amount such that enhanced activity or synergism with the M or MA/AAEM copolymer is demonstrated. Preferably the metal ion is $Zn^{+2}$. Typical salts for zinc which may be used for this purpose are zinc chloride, zinc bromide, zinc chlorate, zinc bromate, zinc borate, zinc nitrate, zinc sulfate, zinc acetate, zinc benzoate, zinc butyrate, zinc carbonate, zinc citrate, and zinc caproate.

The methods and compositions of the present invention are particularly useful in closed cooling water systems. They are also useful in water-based metal working fluids for ferrous metals or in other is industrial applications where high concentrations of inhibitors are typically employed and where there is a desire to avoid using non-heavy metal, non-phosphorous, and/or non-nitrogen corrosion inhibitors.

The present inventors anticipate that the methods and compositions of the present invention will also be useful at inhibiting corrosion of iron-containing metals in contract with mixtures of glycols and water such as those typically found in radiators and other types of heat exchangers.

For purposes of the present invention, the term "iron-containing metal" is defined to include but not be limited to steel, stainless steel, zinc coated steel, phosphated steel, zinc-aluminum coated steel, low carbon steel, and iron.

The total amount of copolymer used in the methods of the present invention is that amount which is sufficient to inhibit corrosion in the aqueous system and will vary according to the conditions in the system. These conditions can be adverse due to the presence of oxidizing biocides, sulfides, sulfate or chloride ions and corrosion products. Higher amounts of these type contaminants can require more of the copolymer to inhibit corrosion.

Typically the amount of copolymer added will range from about 1 part per million parts aqueous system to about 10,000 parts per million parts of aqueous system with a range of about 50 parts to about 1,000 parts per million preferred.

The copolymers of the present invention may be added to the aqueous system by an conventional method. This can be by adding the copolymer as either a dispersion or as a solution using a suitable liquid carrier or solvent. Any solvent that is compatible with the copolymer and the aqueous system may be employed. Preferably this solvent is water.

It has further been discovered that addition of a metal ion selected from the group consisting of zinc, manganese, nickel, aluminum, and tin will improve the corrosion inhibition of the copolymer. This enhanced activity is particularly noticed when zinc ($Zn^{+2}$ ion) is employed with the copolymer.

This composition of copolymer and polyvalent metal salt can be added to the aqueous system as either individual components or as a combination. It is preferred that these individual ingredients are added as a single treatment. The treatment may also be added either intermittently or continuously.

Accordingly, it is possible therefore to produce a more effective iron-containing metal corrosion inhibition treatment that is obtainable by the use of any one ingredient alone when measured as comparable treatment levels. This enhanced activity allows for the concentration of each of these ingredients to be lowered and the total quantity of corrosion inhibitor required may be reduced.

The composition of the copolymer and the polyvalent metal salt allow for lower treatment levels in open cooling water systems and similar industrial water systems where economics dictate lower treatment levels. The composition may be added to the aqueous system in total amount ranging from about 1 part to about 1,000 parts per million parts of water in the aqueous system. Preferably this range is from about 5 parts to about 100 parts per million parts water.

The weight/weight ratio of copolymer to polyvalent metal salt ranges from about 1:1 to about 1,000:1. Preferably this ratio is about 5:1 to about 50:1.

The present inventors have also discovered that compositions comprising the copolymer of M or MA and MEM with polyhydroxy-polycarboxylic acids are effective at inhibiting pitting of iron-containing metal surfaces in aqueous systems. Pitting occurs when anodic and cathodic sites become stationary due to large differences in surface conditions. Once a pit is formed, the solution inside it is isolated from the bulk environment and becomes increasingly corrosive with time.

The polyhydroxy-polycarboxylic acids effective in this invention generally have the formula:

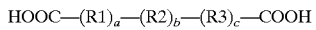

where a, b and c are integers from 0 to 6 and (a+b+c) is greater than 0; R1, R2 and R3 are repeat units in either random or block sequence comprising C=O or CYZ where Y and Z are separately and independently selected from the group consisting of: H, OH, CHO, COOH, $CH_3$, $CH_2(OH)$, $CH(OH)_2$, $CH_2(COOH)$, $CH(OH)(COOH)$, $CH_2(CHO)$, and $CH(OH)CHO$ so that the molecule has a minimum of one OH group when written in its fully hydrated form.

Examples of these polyhydroxy-polycarboxylic acid compounds include but are not limited to mucic acid, D-saccharic acid and ketomalonic acid, tartaric acid and citric acid. Preferably, the acid is saccharic acid.

This composition of copolymer and acid can be added to the aqueous system as either individual components or as a combination. It is preferred that these individual ingredients are added as a single treatment. The treatment may also be added either intermittently or continuously.

The composition of the copolymer and the acid provide for inhibition or pitting in open cooling water systems and similar industrial water systems. The composition may be added to the aqueous system in an amount ranging from about 1 part to about 1,000 parts per million parts of water in the aqueous system. Preferably this range is from about 5 parts to about 100 parts per million parts water.

The weight/weight ratio of copolymer to acid can range from about 10:1 to 1: 10, with a range of 2:1 to 1:3 preferred.

The materials of this invention may be combined with other water treatment chemicals such as other corrosion inhibitors for ferrous and copper-based metallurgy. These other chemicals can also include metal chelating agents, dispersants and deposit control agents as well as oxidizing and non-oxidizing biocides.

The following examples are included as being illustrations of the instant invention and should not be construed as limiting the scope thereof.

EXAMPLES

Preparation of copolymers of 2-acetoacetoxyethyl methacrylate (AAEM) with acrylic acid (AA) or methacrylic acid (MA).

Synthesis Example 1

A reaction flask equipped with a condenser, a thermometer, a nitrogen inlet, and a mechanical stirrer was charged with 2.14 g of AAEM, 0.86 g of MA and 138.00 g of methyl ethyl ketone (MEK). The solution was sparged with nitrogen and heated to 65° C. An initiator solution consisting of 0.33 g of 2,2'-azobisisobutyronitrile (AIBN) and 2.00 g of MEK was then added to the system at 65° C. A monomer mixture containing 8.57 g of MEM and 3.44 g of MA was gradually added to the system in 2 hours. After that, the polymerization was continued for 5 hours at 65° C.

The resulting polymer solution was concentrated using rotary evaporating equipment under vacuum. The concentrate was then poured into n-heptane (v/v, 1/10) to precipitate the polymer out. The polymer was dried overnight in a vacuum oven at 40° C. The dried polymer solids were then dissolved in de-ionized water and neutralized with 1N sodium hydroxide solution. The structure of the resulting polymer was verified by C-13 NMR.

Synthesis Example 2

A reaction flask equipped with a condenser, a thermometer, a nitrogen inlet, and a mechanical stirrer was charged with 226.60 g of MEK. The solution was sparged with nitrogen and heated to 70° C. An initiator solution consisting of 1.50 g of AIBN and 5.00 g of MEK was then added to the system at 70° C. A monomer mixture containing 8.56 g of AAEM and 5.76 g of M was gradually added to the system in 7 hours. After that, the polymerization was continued for 20 minutes at 70° C.

The resulting polymer solution was concentrated using rotary evaporator equipment under vacuum. The concentrate was then poured into diethyl ether (v/v, 2/15) to precipitate polymer out. The polymer was dried overnight in a vacuum oven at 40° C. The dried polymer solids were then dissolved in de-ionized water and neutralized in 1N sodium hydroxide aqueous solution. The structure of the resulting polymer was verified by C-13 NMR.

Applications Examples

The corrosion inhibition activity of the present invention was evaluated with a Beaker Corrosion Test Apparatus (BCTA). The BCTA consists of a two liter beaker equipped with an air/$CO_2$ sparge, 1010 LCS coupon, 1010 LCS electrochemical probe, and magnetic stirrer. The test solution volume is 1.9 liters. The reference electrode and counter electrode of the electrochemical probe are constructed of Hastelloy C22. The beaker is immersed in a water bath for temperature control. The $CO_2$ content of the sparge is controlled to be at a level in equilibrium with the dissolved $CO_2$ content of the test solution at the desired test pH. The initial pH of the test solution is adjusted at test temperature using $H_2SO4$ or NaOH.

Electrochemical corrosion rate data are obtained periodically on 1010 LCS electrodes during the test from potentiodynamic polarization resistance measurements. The slope of the current/potential curve at the corrosion potential is the uncorrected polarization resistance, Rp (uncor). The corrected polarization resistance, Rp (corr), is obtained from Equation I.

$$Rp(corr) = Rp(uncor) - Rs \qquad \text{EQUATION I}$$

wherein Rs is the estimated solution resistance estimated from Equation II:

$$Rs = Ck/K \qquad \text{EQUATION II}$$

where Ck is a cell constant for the specific geometry of the electrochemical probe and K is the conductivity of the test solution at temperature. The 1010 LCS test electrode utilized has an area, A, of 5.0 $cm^2$. Rp(corr) is then converted to a corrosion current density, icorr (mA/$cm^2$) using Equation III:

$$icorr = 1000B/(Rp(corr)A) \qquad \text{EQUATION III}$$

The constant of proportionality, B, the Stern-Geary constant, is assigned a value of 36.6 mV. The corrosion current density is converted to a corrosion rate in a standard fashion (refer to Equation 5 of ASTM G102-89, Standard Practice for Calculation of Corrosion Rates and Related Information from Electrochemical Measurements, ASTM Annual Book of Standards, Vol. 03.02). An equivalent weight of 27.93 and a density of 7.87 g/$cm^3$ are used. At the end of the test, the electrochemically determined corrosion rates are linearly extrapolated to both zero time and is the actual test completion time. The actual and extrapolated data are then integrated to obtain an average electrochemical corrosion rate, EC(avg). The final corrosion rate at the end of the test is, $EC_{LAST}$, is also recorded and tabulated.

In addition, a flat coupon immersed in the beaker is used to visually assess corrosion performance.

Example 1

A test water was used that is representative of an aggressive, moderately hard cooling water. The test water contained:

250 ppm Ca as $CaCO_3$ 125 ppm Mg as $CaCO_3$ 90 ppm M-alkalinity as $CaCO_3$ 300 ppm $Cl^-$ 200 ppm $SO_4^{-2}$ 10 ppm $SiO_2$ Tests were run for 18 hours at a temperature of 120° F. and a pH of 8.4. Because the water is supersaturated with respect to $CaCO_3$, deposit control agents were used in all tests to prevent deposition from complicating the corrosion testing results. The deposit control agents employed were a combination of 7.5 ppm active of an AA/AHPSE copolymer as taught in U.S. Pat. No. 4,659,481 and 7.5 ppm active of poly(epoxysuccinic acid) (PESA), a non-phosphorous deposit control agent disclosed in U.S. Pat. No. 5,256,332. When no inhibitor was added to these deposit control agents, $EC_{AVG}$ is about 55 mpy and $EC_{LAST}$ is about 68 mpy (average values from 15 separate tests).

The results of this testing are reported in Table I.

TABLE I

BCTA Aggressive, Moderately Hard Water

| Copolymer Type | Monomer Ratio | ppm Solids | $EC_{AVG}$ (mpv) | $EC_{LAST}$ (mpv) |
|---|---|---|---|---|
| MA:AAEM | 1:1 | 400 | 23 | 69 |
|  |  | 600 | 13 | 19 |
| MA:AAEM | 1:1 | 400 | 12 | 22 |
|  |  | 600 | 9.8 | 16 |
|  |  | 600 | 16 | 20 |
| MA:AAEM | 1:1 | 400 | 25 | 91 |
|  |  | 600 | 11 | 12 |
| MA:AAEM | 3:2 | 400 | 13 | 27 |
|  |  | 600 | 6.5 | 6.2 |
| MA:AAEM | 2:1 | 400 | 14 | 28 |

TABLE I-continued

BCTA
Aggressive, Moderately Hard Water

| Copolymer Type | Monomer Ratio | ppm Solids | $EC_{AVG}$ (mpv) | $EC_{LAST}$ (mpv) |
|---|---|---|---|---|
|  |  | 600 | 7 | 9.3 |
| AA:AAEM | 2:1 | 600 | 5.7 | 4.9 |
| AA:AAEM | 2:1 | 600 | 3.2 | 2.3 |
| AA:AAEM | 3:2 | 600 | 6.6 | 6.2 |
| AA:AAEM | 1:1 | 600 | 7.2 | 6.5 |

These results demonstrate that the inventive copolymers were effective at reducing corrosion of low carbon steel under conditions approximating typical cooling water conditions.

Example 2

A test water was employed that is representative of conditions where a phosphate-base program is typically used. This test water contained:

500 ppm Ca as $CaCO_3$ 250 ppm Mg as $CaCO_3$ 10 ppm M-Alkalinity as $CaCO_3$ 354 ppm $Cl^-$ 239 ppm $SO_4^{-2}$ Tests were run for 18 hours at a temperature of 120° F. and a pH of 7.4. No other additives were employed. The results of this testing are presented in Table II.

TABLE II

BCTA
No Deposit Control Agents Added

| Additive No. 1 (ppm) | Additive No. 2 (ppm) | $EC_{AVG}$ (mpv) | $EC_{LAST}$ (mpv) | Solution Appearance At End of Test |
|---|---|---|---|---|
| None | None | 85 | 97 | Very Turbid |
| AA:AAEM 2:1 ratio (100) | None | 42 | 48 | Very Slightly Turbid |
| $Zn^{+2}$ (2) | None | 28 | 36 | Turbid |
| AA:AAEM 2:1 ratio (50) | $Zn^{+2}$ (2) | 6.5 | 5.7 | Clear |

These results demonstrate the synergistic interaction between the inventive copolymer and zinc.

Example 3

The testing water as described in Example 1 was employed. The testing conditions were also the same. Saccharic acid and similar hydroxycarboxylate materials are inhibitors of ferrous metal corrosion but are very susceptible to pitting corrosion. The results of this testing are presented in Table Ill.

TABLE III

BCTA
Interaction with Saccharic Acid

| Additive No. 1 (ppm) | Additive No. 2 (ppm) | $EC_{AVG}$ (mpv) | $EC_{LAST}$ (mpv) | Coupon Appearance |
|---|---|---|---|---|
| Saccharic Acid (40) | None | 3.1 | 3.7 | Scattered Pitting |
| Saccharic Acid (40) | None | 2.4 | 2.2 | Slightly Scattered Pitting |
| Saccharic Acid (30) | AA:AAEM (10) 2:1 Ratio | 2.8 | 2.8 | Isolated Pits Near Edge |
| Saccharic Acid (20) | AA:AAEM (20) 2:1 Ratio | 3.6 | 3.3 | A Few Very Minute Blemishes |
| Saccharic Acid (20) | M:AAEM (20) 2:1 Ratio | 3.8 | 3.8 | Clean |
| Saccharic Acid (20) | None | 3.8 | 3.5 | Moderately Dense Scattered Pitting |

As demonstrated in Table III, the use of the inventive copolymer significantly improves the pitting protection afforded by the use of a hydroxycarboxylate material alone. This pitting projection is achieved without using zinc, phosphate or phosphonates.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for inhibiting the corrosion of iron-containing metals in contact with an aqueous system comprising adding to said aqueous system an effective corrosion inhibiting amount of a copolymer of acrylic or methacrylic acid and 2-acetoacetoxyethylmethacrylate.

2. The method as claimed in claim 1 where said copolymer has the formula:

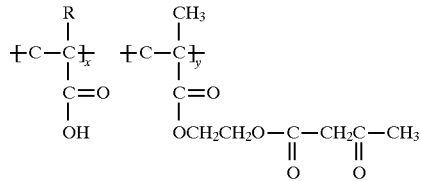

where R is H or $CH_3$ and the ratio of x:y ranges from 10:1 to 1:1.

3. The method as claimed in claim 1 wherein said copolymer has a molecular weight ranging from about 100 to about 100,000.

4. The method as claimed in claim 2 wherein the ratio of x:y in said copolymer is 2:1 and the molecular weight is about 500 to about 1500.

5. The method as claimed in claim 1 further comprising adding to said aqueous system a polyvalent metal salt.

6. The method as claimed in claim 5 wherein said metal is selected from the group consisting of $Zn^{+2}$, $Mn^{+2}$, $Ni^{+2}$, $Al^{+3}$, and $Sn^{+2}$.

7. The method as claimed in claim 1 wherein said copolymer is added to said aqueous system in an amount ranging from about 1 part to about 10,000 parts per million parts of water in said aqueous system.

8. The method as claimed in claim 5 wherein said copolymer and said polyvalent metal are added to said aqueous system in a total amount ranging from about 1 part to about 1,000 parts per million parts of water in said aqueous system.

9. The method as claimed in claim 1 wherein said iron-containing metal is selected from the group consisting of steel, stainless steel, zinc coated steel, phosphated steel, zinc-aluminum coated steel, low carbon steel, and iron.

10. An iron-containing metal corrosion inhibiting composition comprising a copolymer of acrylic or methacrylic acid and 2-acetoacetoxyethylmethacrylate and a polyvalent metal salt.

11. The composition as claim in claim 10 wherein said copolymer has the formula:

$$\left[\begin{array}{c} R \\ | \\ -C-C- \\ | \\ C=O \\ | \\ OH \end{array}\right]_x \left[\begin{array}{c} CH_3 \\ | \\ -C-C- \\ | \\ C=O \\ | \\ OCH_2CH_2O-C-CH_2C-CH_3 \\ \| \quad \| \\ O \quad O \end{array}\right]_y$$

wherein R is H or $CH_3$ and the ratio of x:y ranges from 10:1 to 1:1.

12. The composition as claimed in claim 10 wherein said copolymer has a molecular weight ranging from about 100 to about 100,000.

13. The composition as claimed in claim 11 wherein the ratio of x:y in said copolymer is 2:1 and the molecular weight is about 500 to about 1,500.

14. The composition as claimed in claim 10 wherein the metal in said polyvalent metal salt is selected from the group consisting of $Zn^{+2}$, $Mn^{+2}$, $Ni^{+2}$, $Al^{+3}$, and $Sn^{+2}$.

15. The composition as claimed in claim 14 wherein said metal is $Zn^{+2}$.

16. The composition as claimed in claim 10 wherein the ratio of copolymer to polyvalent metal salt ranges from about 1:1 to about 1,000:1.

17. A method for inhibiting pitting of iron-containing metals in contact with an aqueous system comprising adding to said system an effective amount to inhibit pitting of a composition comprising a copolymer of acrylic or methacrylic acid and 2-acetoacetoxyethylmethacrylate and a polyhydroxy-polycarboxylic acid.

18. The method as claimed in claim 17 copolymer has the formula:

$$\left[\begin{array}{c} R \\ | \\ -C-C- \\ | \\ C=O \\ | \\ OH \end{array}\right]_x \left[\begin{array}{c} CH_3 \\ | \\ -C-C- \\ | \\ C=O \\ | \\ OCH_2CH_2O-C-CH_2C-CH_3 \\ \| \quad \| \\ O \quad O \end{array}\right]_y$$

where R is H or $CH_3$ and the ratio of x:y ranges from 10:1 to 1:1.

19. The method as claimed in claim 17 wherein said copolymer has a molecular weight ranging from about 100 to about 100,000.

20. The method as claimed in claim 18 wherein the ratio of x:y in said copolymer is 2:1 and the molecular weight is about 500 to about 1,500.

21. The method as claimed in claim 17 wherein said polyhydroxy-polycarboxylic acid has the formula:

$$HOOC-(R1)_a-(R2)_b-(R3)_c-COOH$$

where a, b and c are integers from 0 to 6 and (a+b+c) is greater than 0; R1, R2, and R3 are repeat units comprising C=O or CYZ where Y and Z are independently selected from the group consisting of H, OH, CHO, COOH, $CH_3$, $CH_2(OH)$, $CH(OH)_2$, $CH_2(COOH)$, $CH(OH)(COOH)$, $CH_2(CHO)$, and $CH(OH)CHO$, wherein said acid has at least one OH group when fully hydrated.

22. The method as claimed in claim 17 wherein said polyhydroxy-polycarboxylic acid is selected from the group consisting of mucic acid, D-saccharic acid, and ketomalonic acid, tartaric acid, and citric acid.

23. The method as claimed in claim 17 wherein said composition is added to said aqueous system in a total amount ranging from about 1 part to about 1,000 parts per million parts water in said aqueous system.

24. A composition comprising a copolymer of acrylic or methacrylic acid and 2-acetoacetoxyethylmethacrylate and a polyhydroxy-polycarboxylic acid.

25. The composition as claimed in claim 24 wherein said copolymer has the formula:

$$\left[\begin{array}{c} R \\ | \\ -C-C- \\ | \\ C=O \\ | \\ OH \end{array}\right]_x \left[\begin{array}{c} CH_3 \\ | \\ -C-C- \\ | \\ C=O \\ | \\ OCH_2CH_2O-C-CH_2C-CH_3 \\ \| \quad \| \\ O \quad O \end{array}\right]_y$$

wherein R is H or $CH_3$ and the ratio of x:y ranges from 10:1 to 1:1.

26. The composition as claimed in claim 24 wherein said copolymer has a molecular weight ranging from about 100 to about 100,000.

27. The composition as claimed in claim 25 wherein the ratio of x:y in said copolymer is 2:1 and the molecular weight is about 500 to about 1,500.

28. The composition as claimed in claim 24 wherein said polyhydroxy-polycarboxylic acid has the formula:

$$HOOC-(R1)_a-(R2)_b-(R3)_c-COOH$$

where a, b and c are integers from 0 to 6 and (a+b+c) is greater than 0; R1, R2, and R3 are repeat units comprising C=O or CYZ where Y and Z are independently selected from the group consisting of H, OH, CHO, COOH, $CH_3$, $CH_2(OH)$, $CH(OH)_2$, $CH_2(COOH)$, $CH(OH)(COOH)$, $CH_2(CHO)$, and $CH(OH)CHO$, wherein said acid has at least one OH group when fully hydrated.

29. The composition as claimed in claim 28 wherein said polyhydroxy-polycarboxylic acid is selected from the group consisting of mucic acid, D-saccharic acid, ketomalonic acid, tartaric acid, and citric acid.

30. The composition as claimed in claim 24 wherein the ratio of copolymer to acid ranges from about 10:1 to about 1:10.

* * * * *